UNITED STATES PATENT OFFICE 2,403,483

TERTIARY AMINO DERIVATIVES OF DIHYDRO-ANTHRACENE

John W. Cusic, Skokie, Ill., assignor to G. D. Searle & Co., Skokie, Ill., a corporation of Illinois No Drawing. Application October 7, 1943, Serial No. 505,355

5 Claims. (Cl. 260—570.8)

This invention relates to new compositions of matter which may be advantageously used as antispasmodic agents. More particularly, the invention relates to new compositions of matter which are tertiary amino derivatives of dihydroanthracene. These new compounds may be represented by the formulae:

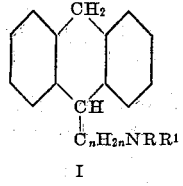 and 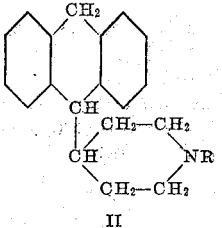

I                   II wherein $n$ stands for the integer 2 or 3 and R and $R^1$ each represents an unsubstituted alkyl group containing not more than four carbon atoms. It will be noted that these compounds are structurally quite similar; those of Formula II can be derived from Formula I (where $n$ is 3 and $R^1$ is an ethyl group) by a simple attachment of the $R^1$ group to the first carbon in the side chain. These compounds have been tested and found to be powerful and useful antispasmodic agents. Only the compounds represented by Formula I above are claimed in this application; the compounds represented by Formula II are claimed in applicant's copending divisional application Serial No. 593,541, filed May 12, 1945.

The prior art has disclosed several different categories of synthetic antispasmodic agents, most of which, however, have been characterized by the presence of some functional group (as, for instance, an ester group) in addition to the tertiary amine group in the molecule. Blicke (Journal of American Chemical Society, volume 61, pages 91 and 771) has disclosed a series of tertiary amines, free of other functional groups, some of which are stated to be active as antispasmodic agents. However, those stated to be active are invariably characterized by the presence of two aralkyl or hydrogenated aralkyl groups attached to the nitrogen atom; conversely, those which contained two simple alkyl groups on the nitrogen atom (as in the present invention) were all stated to be inactive. The antispasmodic agents of this invention thus notably differ from those disclosed as active by Blicke in that they have the one aralkyl group characterized by the dihydroanthracene nucleus, or that the nitrogen is itself a part of a cycloaliphatic ring.

I have found that the compositions of the present invention may be conveniently prepared by the interaction of an alkali metal derivative of dihydroanthracene with an appropriate dialkylaminoalkyl halide or N-methyl-4-halogen-piperidine. The following is a detailed example of such preparation:

Example

A solution of butyl lithium in dry ether is prepared in the usual manner from 27.4 grams of n-butyl bromide and 2.8 grams of lithium. This solution is added gradually to a solution or suspension of 18.0 grams of dihydroanthracene in dry ether, and the resulting solution refluxed for about two hours. The whole operation is preferably conducted under an atmosphere of nitrogen. At the end of this time, 15 grams of γ-diethylaminopropyl chloride are added, and the resultant mixture stirred for twelve hours or more without heating. A small amount of alcohol is added to decompose any unreacted organo-metallic compounds, and the reaction mixture is extracted with dilute hydrochloric acid. The acid extract is made alkaline, and the free base recovered by ether extraction of this alkaline liquor and subsequent evaporation of the ether. It is an oil which can readily be purified by vacuum distillation; it boils at 173–175° centigrade at 6 millimetres of pressure.

The free base readily forms salts with acids, most of which are solid, crystalline compounds which are more convenient to handle for use as medicinals. Further, the salts are in general readily soluble in water, whereas the free base is quite insoluble in water. These salts may be obtained by neutralizing a solution of the base in dry ether with an absolute alcoholic solution of the desired acid. Thus, the hydrochloride was obtained as a crystalline compound which melts at 181–183° centigrade.

The above example is merely illustrative; use of other aminoalkyl halides or of 4-halogen-N-alkylpiperidines in the same procedure will yield the corresponding amines and salts thereof. Among other compounds, I have thus prepared the β-diethylaminoethyl, the β-dibutylaminoethyl, the β-diethylaminopropyl and the N-methyl-piperidyl-4-derivatives of 9,10-dihydroanthracene, together with their hydrochlorides and other salts.

In determining the utility of these substances as antispasmodic agents, I have found that 9-(β-diethylaminoethyl)-9,10-dihydroanthracene hydrochloride is a preferred compound. Illustrative of its utility as an antispasmodic agent is the fact that, when tested on isolated strips of rabbit intestine or uterus, it has shown a powerful relaxing effect, both on untreated muscle and on muscle which had previously been stimulated by a drug such as acetylcholine or histamine. Quantitatively, its potency equals or surpasses that of such drugs as the diethylaminoethyl esters of fluorene-9-carboxylic acid or of diphenylacetic acid, both of which are finding acceptance among the medical professions in this country, and approaches that of atropine.

The γ-diethylaminopropyl derivative was shown to be approximately as potent as the above-cited compound in similar tests. Others will vary among themselves somewhat, but all constitute a group of powerful antispasmodic drugs. They also vary somewhat among themselves in toxicity, but in each case the toxic dose is greatly in excess of the therapeutically effective dose, so that these compounds may be safely administered to man or animals in effective doses without untoward side effects.

It is to be understood that the amino compounds referred to in the appended claims are intended to refer to the bases described therein, whether they be in the form of the free base or of a salt with a non-toxic acid.

I claim:

1. New compositions of matter comprising tertiary amines of the formula:

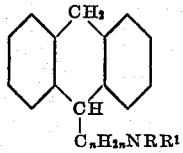

wherein $n$ stands for an integer between 1 and 4, and R and $R^1$ each represent unsubstituted alkyl groups containing not more than four carbon atoms.

2. New compositions of matter comprising tertiary amines of the formula:

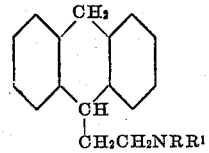

wherein R and $R^1$ each represents unsubstituted alkyl groups containing not more than four carbon atoms.

3. A new composition of matter comprising 9-(β-diethylaminoethyl)-9,10-dihydroanthracene of the formula:

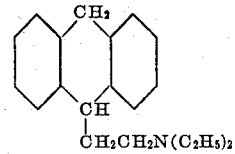

4. New compositions of matter comprising tertiary amines of the formula:

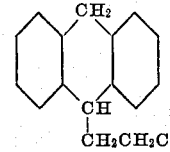

wherein R and $R^1$ each represents an unsubstituted alkyl group containing not more than four carbon atoms.

5. A new composition of matter comprising 9-(γ-diethylaminopropyl)-9,10-dihydroanthracene of the formula:

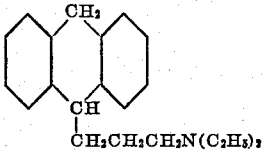

JOHN W. CUSIC.